United States Patent
Aoki et al.

(10) Patent No.: US 9,683,349 B2
(45) Date of Patent: Jun. 20, 2017

(54) WORK VEHICLE

(71) Applicant: KCM Corporation, Hyogo (JP)

(72) Inventors: Isamu Aoki, Tsukuba (JP); Keigo Kikuchi, Ryugasaki (JP); Tetsuji Tanaka, Abiko (JP); Kentaro Oomae, Ushiku (JP)

(73) Assignee: KCM Corporation, Hyogo (JP)

( * ) Notice: Subject to any disclaimer, the term of this patent is extended or adjusted under 35 U.S.C. 154(b) by 0 days.

(21) Appl. No.: 14/914,342

(22) PCT Filed: Dec. 8, 2014

(86) PCT No.: PCT/JP2014/082457
§ 371 (c)(1),
(2) Date: Feb. 25, 2016

(87) PCT Pub. No.: WO2015/093337
PCT Pub. Date: Jun. 25, 2015

(65) Prior Publication Data
US 2016/0201294 A1   Jul. 14, 2016

(30) Foreign Application Priority Data
Dec. 16, 2013 (JP) ................................. 2013-259022

(51) Int. Cl.
*E02F 9/20* (2006.01)
*F02D 29/04* (2006.01)
(Continued)

(52) U.S. Cl.
CPC ............ *E02F 9/2066* (2013.01); *F02D 29/04* (2013.01); *F02D 41/0097* (2013.01);
(Continued)

(58) Field of Classification Search
None
See application file for complete search history.

(56) References Cited

U.S. PATENT DOCUMENTS

2003/0167114 A1   9/2003  Chen
2005/0282682 A1*  12/2005 Ishii ................... B60W 10/06
                                                   477/107
(Continued)

FOREIGN PATENT DOCUMENTS

JP   2000248976 A  *  9/2000
JP   2003-252592 A     9/2003
(Continued)

OTHER PUBLICATIONS

International Search Report (PCT/ISA/210) issued in PCT Application No. PCT/JP2014/082457 dated Mar. 3, 2015 with English translation (Two (2) pages).
(Continued)

*Primary Examiner* — Redhwan K Mawari
*Assistant Examiner* — Michael Whalen
(74) *Attorney, Agent, or Firm* — Crowell & Moring LLP (57) ABSTRACT

A work vehicle equipped with an HST traveling drive device, includes: an operation quantity detector that detects an operation quantity representing an extent to which an accelerator pedal is operated; a rotation rate detector that detects an actual rotation rate at a prime mover; a requested rotation rate calculation unit that calculates a requested rotation rate for the prime mover based upon the operation quantity detected by the operation quantity detector; and a prime mover control unit that controls the actual rotation rate based upon the requested rotation rate calculated by the requested rotation rate calculation unit. When the requested rotation rate is higher than a predetermined value, the requested rotation rate calculation unit calculates a rate of acceleration for the requested rotation rate based upon a difference between the requested and the actual rotation rate detected by the rotation rate detector and calculates the
(Continued)

requested rotation rate based upon the calculated rate of acceleration.

5 Claims, 6 Drawing Sheets

(51) Int. Cl.
*F02D 41/00* (2006.01)
*F02D 41/12* (2006.01)
*F16H 61/42* (2010.01)
*F02D 41/02* (2006.01)
*F16H 59/18* (2006.01)
*F16H 63/50* (2006.01)

(52) U.S. Cl.
CPC ............ *F02D 41/12* (2013.01); *F16H 61/42* (2013.01); *F02D 41/021* (2013.01); *F02D 41/0215* (2013.01); *F02D 2200/602* (2013.01); *F16H 59/18* (2013.01); *F16H 63/50* (2013.01)

(56) References Cited

U.S. PATENT DOCUMENTS

| 2007/0080025 | A1* | 4/2007 | Yamada | B66F 9/07572 187/224 |
| 2007/0084450 | A1* | 4/2007 | Oka | B60K 28/08 123/675 |
| 2008/0082240 | A1* | 4/2008 | Kagoshima | E02F 9/2075 701/50 |

FOREIGN PATENT DOCUMENTS

| JP | 2005-180259 A | 7/2005 |
| JP | 2012-57502 A | 3/2012 |
| JP | 2012197696 A | * 10/2012 |

OTHER PUBLICATIONS

Japanese-language Written Opinion (PCT/ISA/237) issued in PCT Application No. PCT/JP2014/082457 dated Mar. 3, 2015 (Three (3) pages).

* cited by examiner

WORK VEHICLE

TECHNICAL FIELD

The present invention relates to a work vehicle equipped with an HST (hydrostatic transmission) traveling drive device.

BACKGROUND ART

In a work vehicle equipped with an HST traveling drive device configured by connecting a hydraulic motor to a hydraulic pump through a closed circuit connection, the hydraulic pump is directly connected to an engine. The behavior of such a vehicle is thus readily affected by any fluctuation in the engine rotation speed, which may cause the entire vehicle to pitch along the longitudinal axis.

As a means for addressing this issue, a technology whereby excessive acceleration is prevented when a large accelerator operation is performed to start moving from a standing stop or to accelerate a moving work vehicle equipped with an HST traveling drive device by limiting an increase rate per unit time of the actual accelerator operation quantity so as not to exceed a predetermined limit value (see PTL 1).

CITATION LIST

Patent Literature

PTL 1: Japanese Laid Open Patent Publication No. 2012-57502

SUMMARY OF INVENTION

Technical Problem

In the work vehicle disclosed in PTL 1, if the operator steps on the accelerator pedal in order to begin to accelerate at a time when the vehicle is decelerating, an increase in the engine rotation speed is bound to be retarded in a manner similar to that in which it is retarded when the vehicle is to start moving from a standing stop. This means that even when the operator wishes to quickly speed up, the delay in the shift from deceleration to acceleration may compromise responsiveness and work efficiency.

Solution to Problem

According to the 1st aspect of the present invention, a work vehicle equipped with an HST traveling drive device comprises: an operation quantity detector that detects an operation quantity representing an extent to which an accelerator pedal is operated; a rotation speed detector that detects an actual rotation speed at a prime mover; a requested rotation speed calculation unit that calculates a requested rotation speed for the prime mover based upon the operation quantity detected by the operation quantity detector; and a prime mover control unit that controls the actual rotation speed based upon the requested rotation speed calculated by the requested rotation speed calculation unit, wherein: when the requested rotation speed is higher than a predetermined value, the requested rotation speed calculation unit calculates an acceleration for the requested rotation speed based upon a difference between the requested rotation speed and the actual rotation speed detected by the rotation speed detector and calculates the requested rotation speed based upon the acceleration thus calculated.

According to the 2nd aspect of the present invention, it is preferred that in the work vehicle according to the 1st aspect, assuming that a step-on operation is underway in a state in which the actual rotation speed is higher than the requested rotation speed, the requested rotation speed calculation unit calculates a requested rotation speed based upon a first acceleration if the difference between the actual rotation speed and the requested rotation speed is greater than a first threshold value but calculates a requested rotation speed based upon a second acceleration lower than the first acceleration if the difference between the requested rotation speed and the actual rotation speed is less than the first threshold value.

According to the 3rd aspect of the present invention, it is preferred that in the work vehicle according to the 2nd aspect, assuming that a step-on operation is underway at the accelerator pedal, the requested rotation speed calculation unit calculates a requested rotation speed based upon a third acceleration, higher than the second acceleration if the requested rotation speed is lower than the predetermined value.

According to the 4th aspect of the present invention, it is preferred that in the work vehicle according to any one of the 1st through 3rd aspects, assuming that an ease-off operation is underway at the accelerator pedal in a state in which the actual rotation speed is lower than the requested rotation speed, the requested rotation speed calculation unit calculates a requested rotation speed based upon a first deceleration if the difference between the requested rotation speed and the actual rotation speed is greater than the second threshold value but calculates a requested rotation speed based upon a second deceleration lower than the first deceleration if the difference between the requested rotation speed and the actual rotation speed is less than the second threshold value.

According to the 5th aspect of the present invention, it is preferred that in the work vehicle according to the 4th aspect, assuming that an ease-off operation is underway at the accelerator pedal, the requested rotation speed calculation unit calculates a requested rotation speed based upon a third deceleration, higher than the second deceleration if the requested rotation speed is lower than the predetermined value.

Advantageous Effect of Invention

According to the present invention, a work vehicle that prevents excessive acceleration or pitching when starting from a standing stop and allows a prompt shift from deceleration to acceleration can be provided.

BRIEF DESCRIPTION OF THE DRAWINGS

FIG. 1 A side elevation of a wheel loader representing an example of a work vehicle FIG. 2 A diagram schematically illustrating the structure of the wheel loader FIG. 3 A diagram indicating the relationship between the pedal operation quantity at the accelerator pedal and the indicated engine rotation speed FIG. 4 A flowchart of an example of arithmetic processing that may be executed by the controller in order to calculate a requested engine rotation speed FIG. 5 A flowchart of the processing executed in a step-on operation mode presented in (a) and a flowchart of the processing executed in an ease-off operation mode presented in (b)

DESCRIPTION OF EMBODIMENTS

The following is a description of an embodiment of the work vehicle according to the present invention, given in reference to drawings.

Figure 1:
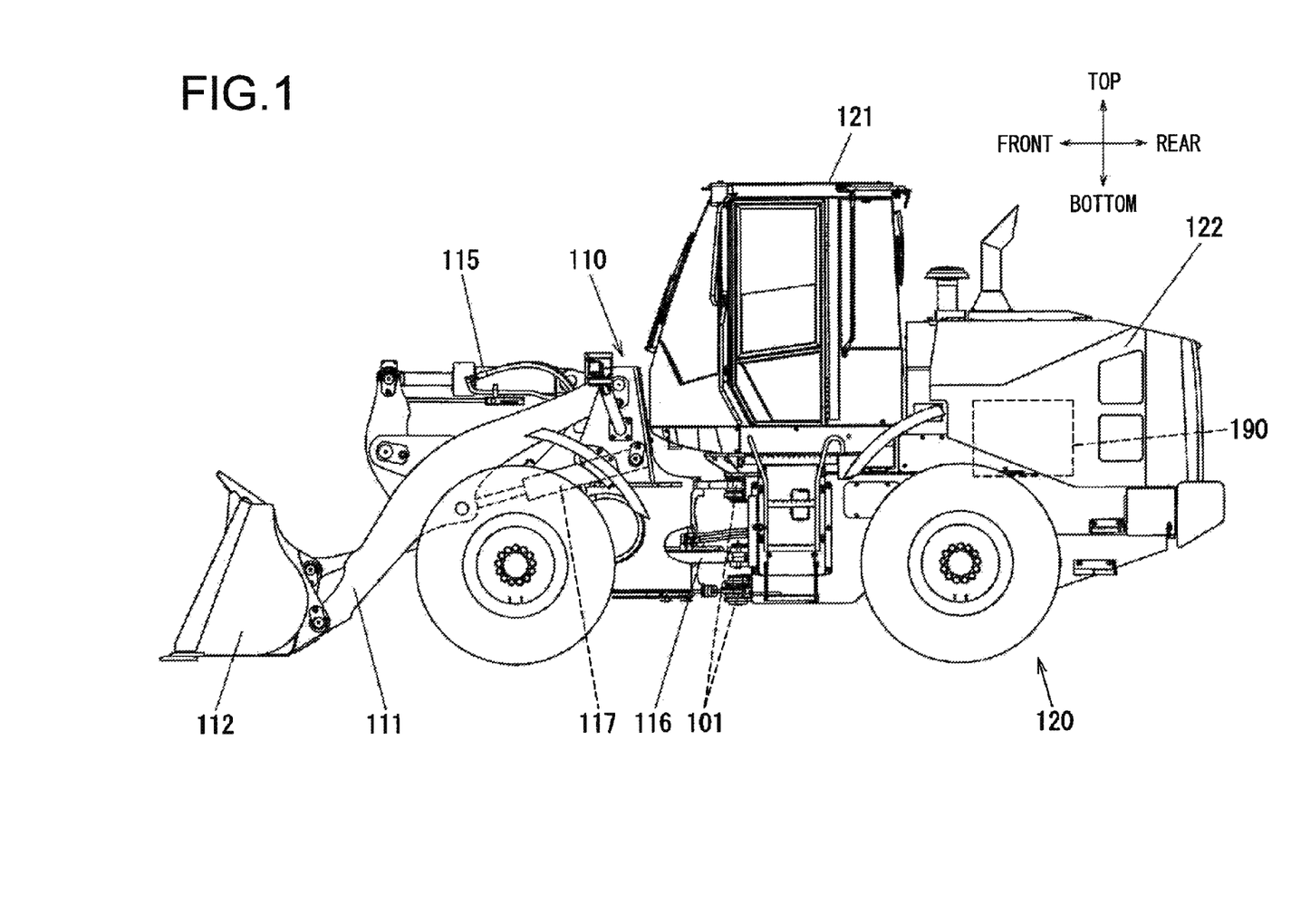

FIG. 1 is a side elevation of a wheel loader representing an example of the work vehicle achieved in the embodiment of the present invention. The wheel loader comprises a front body 110 that includes an arm 111, a bucket 112, front wheels and the like and a rear body 120 that includes an operator's cab 121, a machine room 122, rear wheels and the like.

As the arm 111 is driven via an arm cylinder 117, it rotates up/down (moves upward or downward), whereas as the bucket 112 is driven via a bucket cylinder 115, it rotates up/down (the bucket 112 is engaged in a crowding operation or a dumping operation). The front body 110 and the rear body 120 are connected with each other via a center pin 101 so as to articulate freely relative to each other. As a steering cylinder 116 extends/contracts, the front body 110 pivots to the left or to the right relative to the rear body 120.

An engine 190 is installed inside the machine room 122, whereas various types of operation members such as an accelerator pedal, an arm operation lever and a bucket operation lever, are installed in the operator's cab 121. A return spring is disposed at the accelerator pedal so that when the operator's foot is lifted from the accelerator pedal the pedal returns to its initial position.

Figure 2:
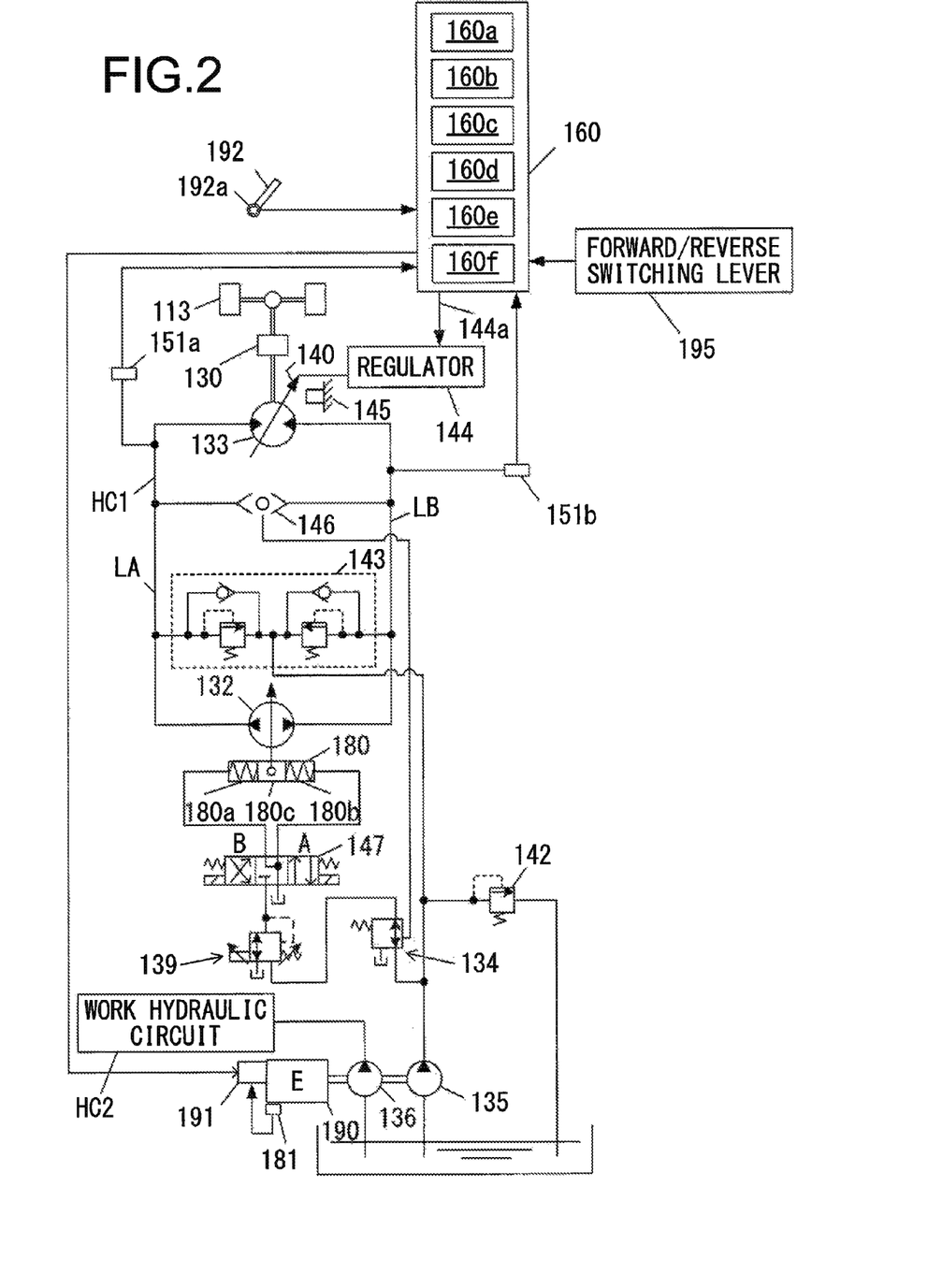

FIG. 2 presents a diagram schematically illustrating the structure of the wheel loader. The wheel loader comprises an HST traveling drive device having a traveling hydraulic circuit HC1, a front drive device having a work hydraulic circuit HC2, a controller 160, various types of operation members, various types of sensors and the like. A traveling hydraulic pump 132 to function as a hydraulic source for the traveling hydraulic circuit HC1, a charge pump 135 and a work hydraulic pump 136 to function as a hydraulic source for the work hydraulic circuit HC2 are connected to the engine 190, and these pumps are driven by the engine 190.

The traveling hydraulic circuit HC1 is configured with an HST circuit comprising the traveling hydraulic pump 132, which is a variable-displacement pump directly connected to the engine 190, and a traveling hydraulic motor 133, which is a variable-displacement motor driven with pressure oil supplied via the traveling hydraulic pump 132, with the traveling hydraulic pump 132 and the traveling hydraulic motor 133 connected with each other through a closed circuit connection via a pair of main lines LA and LB. In the HST circuit, a confinement pressure is generated on the output side of the traveling hydraulic motor 133 in response to easing off on an accelerator pedal 192 and a large braking force is applied to the vehicle and the vehicle slows down as a result.

Pressure oil output from the charge pump 135 is guided, via a cutoff valve 134, an electromagnetic proportional pressure-reducing valve 139 and a forward/reverse switching valve 147, to a tilting cylinder 180. The cutoff valve 134 cuts off the supply of pressure oil to the forward/reverse switching valve 147 with the circuit pressure in the traveling hydraulic circuit HC1. At the electromagnetic proportional pressure-reducing valve 139, which is controlled with a signal provided by the controller 160, the pressure of pressure oil to be guided to the tilting cylinder 180 via the forward/reverse switching valve 147 is controlled. When the forward/reverse switching valve 147, which is engaged in operation in response to a signal provided by the controller 160, is set at a neutral position, as shown in the figure, tank pressure is individually applied to oil chambers 180a and 180b at the tilting cylinder 180. In this state, the pressure applied to the oil chamber 180a and the pressure applied to the oil chamber 180b are equal to each other, with a piston 180c assuming the neutral position. The displacement volume of the traveling hydraulic pump 132 is thus 0 and the pump output quantity is also 0.

As the forward/reverse switching valve 147 is switched to an A side, the pressure oil output via the charge pump 135, with pressure reduced at the electromagnetic proportional pressure-reducing valve 139 for pressure adjustment, is delivered into the oil chamber 180a and the tank pressure is applied to the oil chamber 180b. As a result, the piston 180c at the tilting cylinder 180 is displaced to the right in the figure in correspondence to the pressure of the pressure oil delivered into the oil chamber 180a. Consequently, the pump tilting quantity at the traveling hydraulic pump 132 increases, the pressure oil from the traveling hydraulic pump 132 is guided to the traveling hydraulic motor 133 via the main line LA to cause forward rotation of the traveling hydraulic motor 133, and the vehicle thus moves forward.

As the forward/reverse switching valve 147 is switched to the B side, the pressure oil output via the charge pump 135, with its pressure reduced at the electromagnetic proportional pressure-reducing valve 139 for pressure adjustment, is delivered into the oil chamber 180b and the tank pressure is applied to the oil chamber 180a. As a result, the piston 180c at the tilting cylinder 180 is displaced to the left in the figure in correspondence to the pressure of the pressure oil delivered into the oil chamber 180b. As a result, the pump tilting quantity of the traveling hydraulic pump 132 increases, the pressure oil from the traveling hydraulic pump 132 is guided to the traveling hydraulic motor 133 via the main line LB to cause reverse rotation of the traveling hydraulic motor 133, and the vehicle thus moves backward.

The pressure oil output via the charge pump 135 is guided to the main lines LA and LB through a check valve installed inside an overload relief valve 143 and the traveling hydraulic circuit HC1 is recharged with this pressure oil. The upstream-side pressure at the electromagnetic proportional pressure-reducing valve 139 is restricted via a charge relief valve 142. Either the pressure in the main line LA or the pressure in the main line LB that is higher than the other is applied to the cutoff valve 134 via a shuttle valve 146. As the pressure applied to the cutoff valve 134, as described above, becomes equal to or higher than a predetermined pressure setting, the cutoff valve 134 opens so as to set the piston 180c of the tilting cylinder 180 at the neutral position by setting the pressure supplied to the oil chamber 180a and 180b at the tilting cylinder 180 to the tank pressure. As a result, the quantity of output from the traveling hydraulic pump 132 is reduced to 0, and the pressure in the main line LA or the pressure in the main line LB that is higher than the other is restricted so as not to exceed the pressure setting selected for the cutoff valve 134. When a pressure greater than the pressure setting is applied to the higher pressure side in the main lines LA and LB, the pressure is restricted via the overload relief valve 143.

The controller 160 and an engine controller 191 each include an arithmetic processing device comprising a CPU, a ROM and a RAM used as storage devices, other referral circuits and the like. The controller 160 is a control device that controls various parts of the wheel loader, whereas the engine controller 191 is a control device that controls a fuel injection system.

A signal output by a forward/reverse switching lever 195 is input to the controller 160. Based upon an instruction signal indicating forward, reverse or neutral, provided thereto via the forward/reverse switching lever 195, the controller 160 controls the forward/reverse switching valve 147. The controller 160 executes control so as to select a forward mode and switch the forward/reverse switching valve 147 to the A side when a forward instruction signal is input thereto from the forward/reverse switching lever 195. The controller 160 executes control so as to select a reverse mode and switch the forward/reverse switching valve 147 to the B side when a reverse instruction signal is input thereto from the forward/reverse switching lever 195. The controller 160 executes control so as to select a neutral mode and switch the forward/reverse switching valve 147 to a neutral position when a neutral instruction signal is input thereto from the forward/reverse switching lever 195.

The speed of the traveling hydraulic motor 133 is adjusted via a transmission 130 and the rotation having thus undergone speed change is transmitted via a drive shaft and axles to tires 113 and the vehicle is thus able to travel. The transmission 130 can be switched to either of two speed stages, i.e., low and high, through an operation of a high/low selector switch (not shown).

A signal provided from an operation quantity detector 192*a* that detects a pedal operation quantity (a pedal stroke or a pedal angle) representing the extent to which the accelerator pedal 192 is operated and signals provided by pressure detectors 151*a* and 151*b*, which respectively detect the pressures (traveling load pressures) in the main lines LA and LB, are individually input to the controller 160. A signal provided from an engine rotation speed sensor 181 that detects the actual rotation speed of the engine 190 (hereafter notated as an actual engine rotation speed Na) is input to the engine controller 191.

As the operator steps on the accelerator pedal 192 in the work vehicle equipped with the HST traveling drive device, the rotation speed of the engine 190, directly connected with the traveling hydraulic pump 132, increases and the vehicle accelerates, whereas as the operator eases off on the accelerator pedal 192, the rotation speed of the engine 190 decreases and also a hydraulic braking force is generated, resulting in deceleration of the vehicle. In other words, the behavior of a work vehicle equipped with an HST traveling drive device is readily affected by changes in the engine rotation speed and, for this reason, excessive acceleration tends to occur or the entire vehicle tends to pitch along its longitudinal axis, as the vehicle starts moving. In order to prevent excessive acceleration and pitching when the vehicle starts moving, the response of the engine rotation speed to the pedal operation quantity at the accelerator pedal 192 may be retarded. However, this solution gives rise to a delay occurring before the vehicle begins to move or reaccelerate in response to the operator stepping on the accelerator pedal 192 or a delay in the generation of a tractive force after the operator releases the accelerator pedal 192. Accordingly, rates of acceleration and rates of deceleration with respect to a requested engine rotation speed are calculated based upon the requested engine rotation speed and the actual engine rotation speed, and the rotation speed of the engine 190 is controlled based upon the acceleration and the deceleration thus calculated in this embodiment. A detailed explanation is provided below.

It is to be noted that the requested engine rotation speed Nr, which is a target rotation speed requested of the engine 190 by the controller 160 and the engine controller 191, is calculated as will be described later.

The controller 160 has functions achieved in the form of an indicated rotation speed setting unit 160*a*, a pedal operation decision-making unit 160*b*, a condition decision-making unit 160*c*, an acceleration/deceleration setting unit 160*d*, a requested rotation speed setting unit 160*e* and an indicated rotation speed match decision-making unit 160*f*.

Figure 3:
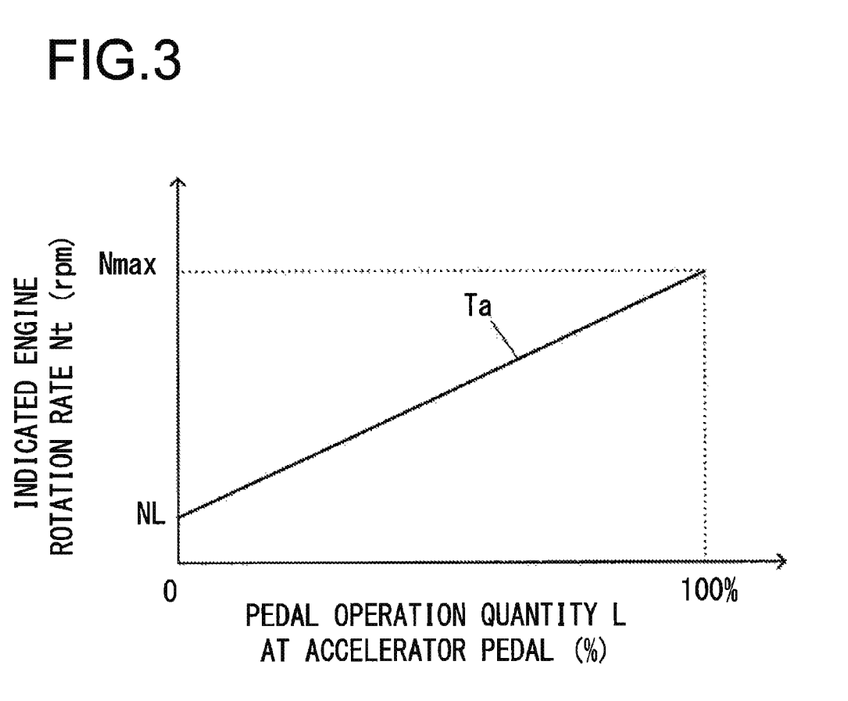

FIG. 3 is a diagram indicating the relationship between a pedal operation quantity L at the accelerator pedal 192 and an indicated engine rotation speed Nt. In a storage device at the controller 160, a characteristics table Ta of the indicated engine rotation speed Nt corresponding to the pedal operation quantity L at the accelerator pedal 192 is stored in a lookup table. It is to be noted that the pedal operation quantity L, indicated along the horizontal axis, is at 100% in a maximum operation state and at 0% in a non-operation state in which the operator is not stepping on the accelerator pedal.

The indicated engine rotation speed Nt, which takes a value directly requested by the operator, constitutes a target engine rotation speed command value requested of the controller 160 by the operator.

When the accelerator pedal 192 is completely released, i.e., when the pedal operation quantity L at the accelerator pedal 192 is 0%, the indicated engine rotation speed Nt is a low idle rotation speed NL (e.g., 800 rpm). As the pedal operation quantity L increases, the indicated engine rotation speed Nt also increases, and when the accelerator pedal 192 is stepped on to the maximum extent, i.e., when the pedal operation quantity L at the accelerator pedal 192 is 100%, the indicated engine rotation speed Nt matches a rated rotation speed Nmax (e.g., 2450 rpm).

The indicated rotation speed setting unit 160*a* shown in FIG. 2 sets the indicated engine rotation speed Nt based upon the pedal operation quantity L detected by the operation quantity detector 192*a* by referencing the table Ta (see FIG. 3) and stores the indicated engine rotation speed Nt into a storage device.

The pedal operation decision-making unit 160*b* makes a decision as to whether the operator is stepping on the accelerator pedal 192 or the operator is easing off on the accelerator pedal 192. The pedal operation decision-making unit 160*b* makes a decision as to whether or not the indicated engine rotation speed Nt set in correspondence to the current pedal operation quantity L at the accelerator pedal 192 is equal to or higher than the requested engine rotation speed Nr having been calculated for the immediately-preceding control cycle, as will be explained later. If the indicated engine rotation speed Nt is equal to or higher than the requested engine rotation speed Nr (Nt≥Nr), the pedal operation decision-making unit 160*b* decides that the operator is stepping on the accelerator pedal 192 and sets an operation mode for the accelerator pedal 192 to a "step-on operation mode". If, on the other hand, the indicated engine rotation speed Nt is lower than the requested engine rotation speed Nr (Nt<Nr), the pedal operation decision-making unit 160*b* decides that the operator is easing off on the accelerator pedal 192 and sets the operation mode for the accelerator pedal 192 to a "ease-off operation mode".

Based upon the operation mode selected for the accelerator pedal 192, the level of the requested engine rotation speed Nr and the difference between the requested engine rotation speed Nr and the actual engine rotation speed Na, the condition decision-making unit 160c makes a decision as to whether or not any of; the high acceleration condition, the low acceleration condition, high deceleration condition and a low deceleration condition exists. The high acceleration condition is a condition for raising the acceleration in the requested engine rotation speed Nr, whereas the low acceleration condition is a condition for lowering the acceleration in the requested engine rotation speed Nr. The high deceleration condition is a condition for raising the rate of decease in the requested engine rotation speed Nr, i.e., a condition for increasing the absolute value of the rate of negative increase, whereas the low deceleration condition is a condition for lowering the deceleration in the requested engine rotation speed Nr, i.e., a condition for decreasing the absolute value of the rate of negative increase.

The condition decision-making unit 160c makes a decision as to whether or not the requested engine rotation speed Nr is equal to or lower than a predetermined value N0. The predetermined value N0, which is a value greater than the low idle rotation speed NL, e.g., 1000 rpm, is stored in advance in a storage device.

If the requested engine rotation speed Nr is determined to be equal to or lower than the predetermined value N0 (Nr≤N0) in the step-on operation mode, the condition decision-making unit 160c decides that the high acceleration condition exists and the low acceleration condition does not exist.

If the requested engine rotation speed Nr is equal to or lower than the predetermined value N0 (Nr≤N0) in the ease-off operation mode, the condition decision-making unit 160c decides that the high deceleration condition exists and the low deceleration condition does not exist.

If it is decided in the step-on operation mode that the requested engine rotation speed Nr is higher than the predetermined value N0 (Nr>N0), the condition decision-making unit 160c subtracts the requested engine rotation speed Nr from the actual engine rotation speed Na and makes a decision as to whether or not the difference (Na−Nr) determined through the subtraction operation is greater than a threshold value N1. If the difference (Na−Nr) is greater than the threshold value N1 (Na−Nr>N1), the condition decision-making unit 160c decides that the high acceleration condition exists and the low acceleration condition does not exist. If the difference (Na−Nr) is equal to or less than the threshold value N1 (Na−Nr≤N1), the condition decision-making unit 160c decides that the high acceleration condition does not exist and the low acceleration condition exists. The threshold value N1, which may be, for instance, 200 rpm, is stored in advance in a storage device.

If it is decided in the ease-off operation mode that the requested engine rotation speed Nr is higher than the predetermined value N0 (Nr>N0), the condition decision-making unit 160c subtracts the actual engine rotation speed Na from the requested engine rotation speed Nr and makes a decision as to whether or not the difference (Na−Nr) determined through the subtraction operation is equal to or greater than a threshold value N2. If the difference (Nr−Na) is equal to or greater than a threshold value N2 (Nr−Na≥N2), the condition decision-making unit 160c decides that the high deceleration condition exists and the low deceleration condition does not exist. If the difference (Nr−Na) is r less than the threshold value N2 (Nr−Na<N2), the condition decision-making unit 160c decides that the high deceleration condition does not exist and the low deceleration condition exists. The threshold value N2, which may be, for instance, 200 rpm, is stored in advance in a storage device.

If it is decided that the high acceleration condition exists, the acceleration/deceleration setting unit 160d sets a acceleration Ra with respect to the requested engine rotation speed Nr to Rah. If it is decided that the low acceleration condition exists, the acceleration/deceleration setting unit 160d sets the acceleration Ra with respect to the requested engine rotation speed Nr to Ras lower than Rah (Ras<Rah). The acceleration Ra is the rate of increase in the requested engine rotation speed Nr[rpm] per unit time of 10 [ms]. In the embodiment, Rah=100 [rpm]/10 [ms] and Ras=14 [rpm]/10 [ms].

If it is decided that a high deceleration condition exists, the acceleration/deceleration setting unit 160d sets a deceleration Rd with respect to the requested engine rotation speed Nr to Rdh. If it is decided that a low deceleration condition exists, the acceleration/deceleration setting unit 160d sets the deceleration Rd with respect to the requested engine rotation speed Nr to Rds lower than Rdh (Rds<Rdh). The deceleration Rd is the rate of decrease in the requested engine rotation speed Nr[rpm] per unit time of 10 [ms]. In the embodiment, Rdh=100 [rpm]/10 [ms] and Rds=14 [rpm]/10 [ms]. It is to be noted that a greater deceleration means that the rate of negative increase is smaller, i.e., the absolute value of the rate negative increase is greater.

Based upon the acceleration Ra or the deceleration Rd set by the acceleration/deceleration setting unit 160d, the requested rotation speed setting unit 160e calculates the requested engine rotation speed Nr. Over each predetermined control cycle 10 [ms], the controller 160 in the embodiment calculates a new requested engine rotation speed Nr by adding a predetermined rotation speed, so as to increase the requested engine rotation speed Nr, to the requested engine rotation speed Nr having been calculated and stored into a storage device for the immediately preceding control cycle or by subtracting a predetermined rotation speed so as to decrease the requested engine rotation speed Nr from the requested engine rotation speed Nr having been calculated and stored into the storage device for the immediately preceding control cycle.

The acceleration/deceleration rate setting 160d calculates the requested engine rotation speed Nr that increases at the acceleration Ra=Rah=100 [rpm]/10 [ms] by setting the rotation speed increase α per 10 [ms] to α=αh=100 [rpm]. The acceleration/deceleration setting unit 160d calculates the requested engine rotation speed Nr that increases at the acceleration Ra=Ras=14 [rpm]/10 [ms] by setting the rotation speed increase α per 10 [ms] to α=αs=14 [rpm]. Namely, the acceleration/deceleration setting unit 160d determines a new requested engine rotation speed Nr with an increase over the requested engine rotation speed Nr having been calculated for the immediately preceding control cycle (10 ms prior) by adding the rotation speed increase α to the previous requested engine rotation speed Nr and updates the requested engine rotation speed Nr in the storage device with the newly calculated value.

The acceleration/deceleration setting unit 160d calculates the requested engine rotation speed Nr that decreases at the deceleration Rd=Rdh=100 [rpm]/10 [ms] by setting the rotation speed decrease β per 10 [ms] to β=βh=100 [rpm]. The acceleration/deceleration setting unit 160d calculates the requested engine rotation speed Nr that decreases at the deceleration Rd=Rds=14 [rpm]/10 [ms] by setting the rotation speed decrease β per 10 [ms] to β=βs=14 [rpm]. Namely, the acceleration/deceleration setting unit 160*d* determines a new requested engine rotation Nr with a decrease relative to the requested engine rotation speed Nr having been calculated for the immediately preceding control cycle (10 ms prior) by subtracting the rotation speed β from the previous requested engine rotation speed Nr and updates the requested engine rotation speed Nr in the storage device with the newly calculated value.

The controller 160 having the functions described above is capable of calculating the requested engine rotation speed Nr in the step-on operation mode and in the ease-off operation mode as will be individually described next.

—When the Step-on Operation Mode is Selected—

(i) When the high acceleration condition exists, the requested rotation speed setting unit 160*e* sets a value representing the sum obtained by adding the rotation speed increase α=αh=100 [rpm] to the requested engine rotation speed Nr having been calculated for the immediately preceding control cycle, as the new requested engine rotation speed Nr.

(ii) When the low acceleration condition exists, the requested rotation speed setting unit 160*e* sets a value representing the sum obtained by adding the rotation speed increase α=αs=14 [rpm] to the requested engine rotation speed Nr having been calculated for the immediately preceding control cycle, as the new requested engine rotation speed Nr.

—When the Ease-Off Operation is Selected—

(iii) When the high deceleration condition exists, the requested rotation speed setting unit 160*e* sets a value representing the difference obtained by subtracting the rotation speed βh=100 [rpm] from the requested engine rotation speed Nr having been calculated for the immediately preceding control cycle as the new requested engine rotation speed Nr.

(iv) When the low deceleration condition exists, the requested rotation speed setting unit 160*e* sets a value representing the difference obtained by subtracting the rotation speed βs=14 [rpm] from the requested engine rotation speed Nr having been calculated for the immediately preceding control cycle as the new requested engine rotation speed Nr.

The processing for setting the requested engine rotation speed Nr as described in (i) through (iv) is repeatedly executed over 10 [ms] control cycles. Namely, the requested engine rotation speed Nr is calculated for every control cycle 10 [ms] and the data for the requested engine rotation speed Nr stored in the storage device are thus updated.

The indicated rotation speed match decision-making unit 160*f* calculates the absolute value (|Nt−Nr|) of the difference between the indicated engine rotation speed Nt and the requested engine rotation speed Nr and makes a decision as to whether or not the absolute value (|Nt−Nr|) is smaller than a threshold value ΔN0. If the absolute value (|Nt−Nr|) of the difference between the indicated engine rotation speed Nt and the requested engine rotation speed Nr is smaller than the threshold value ΔN0 (|Nt−Nr|<ΔN), the indicated rotation speed match decision-making unit 160*f* decides that the requested engine rotation speed Nr has reached to the indicated engine rotation speed Nt corresponding to the pedal operation quantity L at the accelerator pedal 192. If the absolute value (|Nt−Nr|) of the difference between the indicated engine rotation speed Nt and the requested engine rotation speed Nr is equal to or greater than the threshold value ΔN0 (|Nt−Nr|≥ΔN), the indicated rotation speed match decision-making unit 160*f* decides that the requested engine rotation speed Nr has not reached the indicated engine rotation speed Nt corresponding to the pedal operation quantity L at the accelerator pedal 192. The threshold value ΔN0, which may be, for instance, 200 rpm, is stored in advance in a storage device.

If it is decided that the requested engine rotation speed Nr has not reached the indicated engine rotation speed Nt corresponding to the pedal operation quantity L at the accelerator pedal 192, the requested rotation speed setting unit 160*e* calculates a new requested engine rotation speed Nr so as to update the data for the requested engine rotation speed Nr in the storage device. If it is decided that the requested engine rotation speed Nr has become equal to the indicated engine rotation speed Nt corresponding to the pedal operation quantity L at the accelerator pedal 192, the requested rotation speed setting unit 160*e* does not execute the processing for calculating a new requested engine rotation speed Nr.

The controller 160 outputs a requested engine rotation speed signal, which corresponds to the requested engine rotation speed Nr having been calculated, to the engine controller 191. The engine controller 191 compares the actual engine rotation speed Na detected by the engine rotation speed sensor 181 with the requested engine rotation speed Nr provided by the controller 160 and controls the fuel injection system (not shown) so as to adjust the actual engine rotation speed Na towards the requested engine rotation speed Nr.

A regulator 144 that controls the motor tilt angle of the traveling hydraulic motor 133 is connected to the controller 160. The regulator 144 is an electric regulator that includes an electromagnetic switching valve, an electromagnetic proportional valve and the like. The regulator 144 is driven with a control current from the controller 160, which is output via a signal line 144*a*. As the regulator 144 is driven, a tilt control lever 140 is driven, thereby altering the motor tilt angle. The minimum value taken for the motor tilt angle is mechanically limited by setting the tilt control lever 140 in contact with a stopper 145. When no power is supplied to the regulator 144, the tilt control lever 140 is in contact with the stopper 145 so as to hold the motor tilt angle at the minimum value. As the control current output to the regulator 144 increases, the motor tilt angle also increases.

Figure 4:
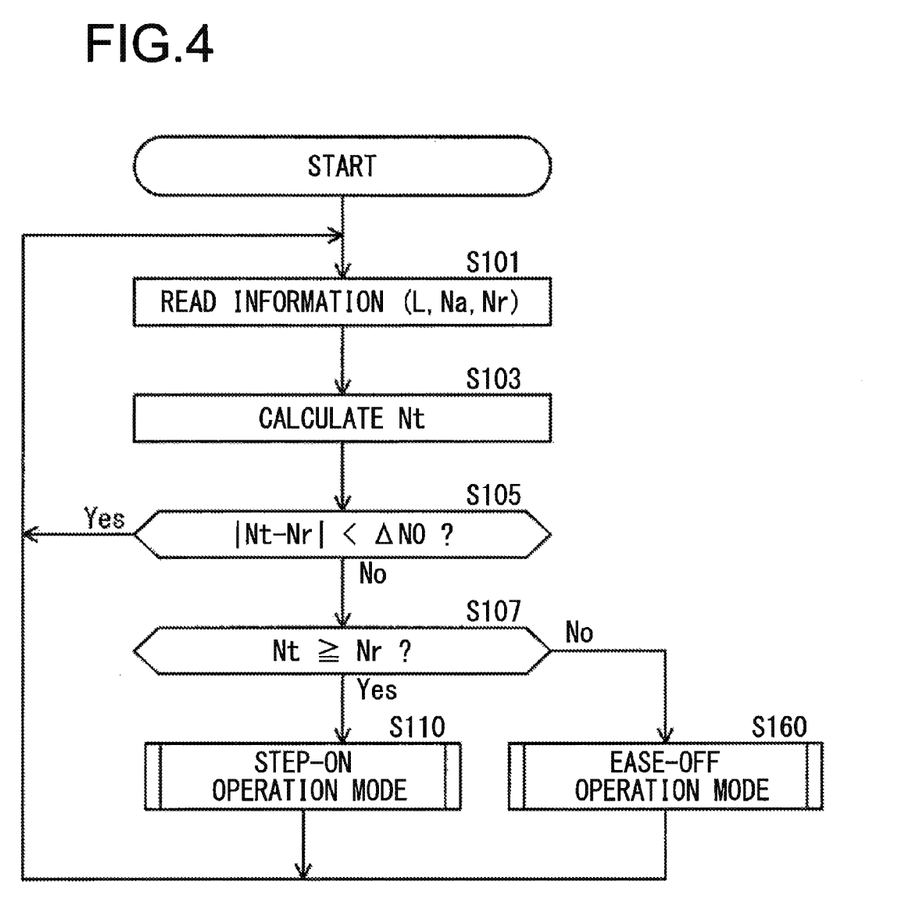
Figure 5:
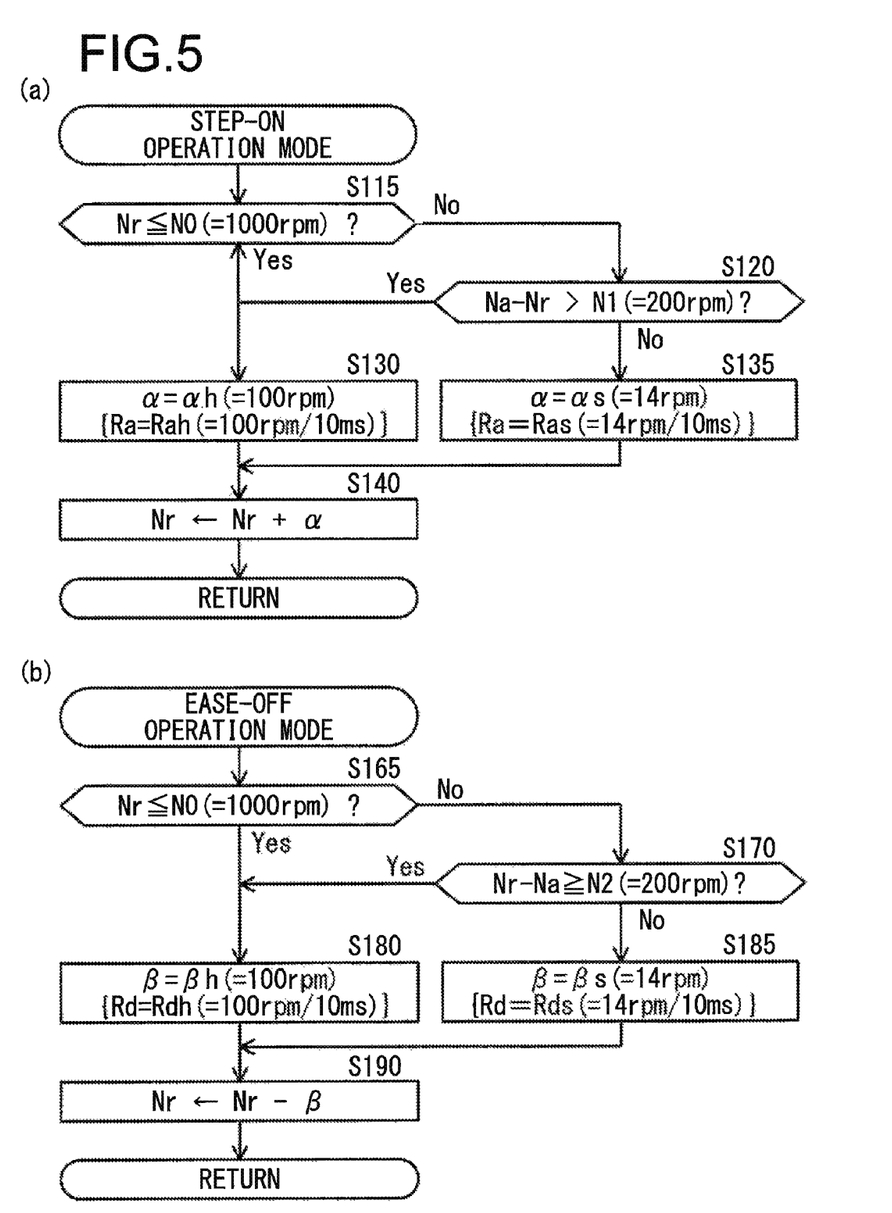

FIG. 4 presents a flowchart of an example of arithmetic processing that may be executed by the controller 160 to calculate the requested engine rotation speed. The processing in the flowchart starts as an ignition switch (not shown) is turned on, and once settings are initialized, the processing in step S101 and subsequent steps is repeatedly executed by the controller 160 over predetermined control cycles (every 10 [ms] as explained earlier in the embodiment). FIG. 5(*a*) presents a flowchart of the processing executed in the step-on operation mode (step S110) in FIG. 4, whereas FIG. 5(*b*) presents a flowchart of the processing executed in the ease-off operation mode (step S160) in FIG. 4.

In step S101, the controller 160 obtains information indicating the operation quantity L detected by the operation quantity detector 192*a*, the actual engine rotation speed Na detected by the engine rotation speed sensor 181 and the requested engine rotation speed Nr having been calculated for the immediately preceding control cycle (10 ms prior) and stored in the storage device (i.e., the previous value for the requested engine rotation speed), and then the operation proceeds to step S103. It is to be noted that at the time of initialization of settings when the accelerator pedal 192 is not being operated, the requested engine rotation speed Nr may be set to, for instance, 800 rpm and in such a case, the indicated engine rotation speed Nt corresponding to the operation quantity L at the accelerator pedal 192 detected by the operation quantity detector 192*a* will be set to 800 rpm. In other words, in the initial state immediately following ignition startup, with no operation of the accelerator pedal 192, the indicated engine rotation speed Nt and the requested engine rotation speed Nr assume values equal to each other.

In step S103, the controller 160 sets the indicated engine rotation speed Nt based upon the pedal operation quantity L at the accelerator pedal 192 by referencing the table Ta (see FIG. 3) stored in a storage device, and then the operation proceeds to step S105.

In step S105, the controller 160 makes a decision as to whether or not the absolute value of the difference between the indicated engine rotation speed Nt set in step S103 and the requested engine rotation speed Nr obtained in step S101 is less than the threshold value ΔN0. If an affirmative decision is made in step S105, the operation returns to step S101, whereas if a negative decision is made, the operation proceeds to step S107.

For instance, in the initial state in which the accelerator pedal 192 is not being operated, the accelerator pedal 192 may be stepped on to the maximum extent in order to start the vehicle moving. Under such circumstances, the indicated engine rotation speed Nt immediately reaches Nmax, but since a new requested engine rotation speed Nr has not yet been calculated in this situation, the requested engine rotation speed Nr is kept at the initial NL setting (800 rpm). Thus, a difference equal to or greater than the threshold value ΔN0 is manifested by the indicated engine rotation speed Nt and the requested engine rotation speed Nr, and a negative decision is made in step S105. In addition, an affirmative decision made in step S105 means that the requested engine rotation speed Nr has reached the indicated engine rotation speed Nt and, in such a case, a new requested engine rotation speed Nr is not calculated, as has been explained earlier.

In step S107, the controller 160 makes a decision as to whether or not the indicated engine rotation speed Nt set in step S103 is equal to or higher than the requested engine rotation speed Nr obtained in step S101. If an affirmative decision is made in step S107, the controller 160 selects the step-on operation mode for the operation mode before proceeding to step S110, whereas if a negative decision is made, the controller 160 selects the ease-off operation mode for the operation mode before proceeding to step S160. Namely, when a significant difference, equal to or greater than the threshold value ΔN0 is manifested by the indicated engine rotation speed Nt and the requested engine rotation speed Nr and the indicated engine rotation speed Nt is equal to or higher than the requested engine rotation speed Nr, the controller 160 shifts into the step-on operation mode in order to calculate a new requested engine rotation speed Nr. In addition, when a significant difference, equal to or greater than the threshold value ΔN0, is manifested by the indicated engine rotation speed Nt and the requested engine rotation speed Nr and the indicated engine rotation speed Nt is lower than the requested engine rotation speed Nr, the controller 160 shifts into the ease-off operation mode in order to calculate a new requested engine rotation speed Nr.

In step S110, the controller 160 executes processing for calculating a new requested engine rotation speed Nr in the step-on operation mode. As shown in FIG. 5(*a*), the controller 160 makes a decision in step S115 as to whether or not the requested engine rotation speed Nr is equal to or lower than the predetermined value N0. If an affirmative decision is made in step S115, i.e., if it is decided that the high acceleration condition exists and the low acceleration condition does not exist, the operation proceeds to step S130, whereas if a negative decision is made, the operation proceeds to step S120.

In step S120, the controller 160 makes a decision as to whether or not the value obtained by subtracting the requested engine rotation speed Nr from the actual engine rotation speed Na is greater than the threshold value N1. If an affirmative decision is made in step S120, i.e., if it is decided that the high acceleration condition exists and the low acceleration condition does not exist, the operation proceeds to step S130. If a negative decision is made in step S120, i.e., if it is decided that the high acceleration condition does not exist and the low acceleration condition exists, the operation proceeds to step S135.

In step S130, the controller 160 sets the rotation speed increase α per 10 [ms] to α=αh=100 [rpm]. This processing is equivalent to the controller 160 setting the acceleration Ra to Ra=Rah=100 [rpm]/10 [ms].

In step S135, the controller 160 sets the rotation speed increase α per 10 [ms] to α=αs=14 [rpm]. This processing is equivalent to the controller 160 setting the acceleration Ra to Ra=Ras=14 [rpm]/10 [ms].

Once the rotation speed increase α is set in step S130 or S135, the operation proceeds to step S140. In step S140, the controller 160 calculates a new requested engine rotation speed Nr by adding the rotation speed α to the previous value for the requested engine rotation speed Nr, stores the new requested engine rotation speed Nr into the storage device and ends the arithmetic processing for calculating the requested engine rotation speed Nr in the step-on operation mode, before the operation returns to step S101.

In step S160, the controller 160 executes processing for calculating a new requested engine rotation speed Nr in the ease-off operation mode. As shown in FIG. 5(*b*), the controller 160 makes a decision in step S165 as to whether or not the requested engine rotation speed Nr is equal to or lower than the predetermined value N0. If an affirmative decision is made in step S165, i.e., if it is decided that the high deceleration condition exists and the low deceleration condition does not exist, the operation proceeds to step S180, whereas if a negative decision is made, the operation proceeds to step S170.

In step S170, the controller 160 makes a decision as to whether or not the value obtained by subtracting the actual engine rotation speed Na from the requested engine rotation speed Nr is equal to or greater than the threshold value N2. If an affirmative decision is made in step S170, i.e., if it is decided that the high deceleration condition exists and the low deceleration condition does not exist, the operation proceeds to step S180. If a negative decision is made in step S170, i.e., if it is decided that the high deceleration condition does not exist and the low deceleration condition exists, the operation proceeds to step S185.

In step S180, the controller 160 sets the rotation speed decrease β per 10 [ms] to β=βh=100 [rpm]. This processing is equivalent to the controller 160 setting the deceleration Rd to Rd=Rdh=100 [rpm]/10 [ms].

In step S185, the controller 160 sets the rotation speed decrease β per 10 [ms] to β=βs=14 [rpm]. This processing is equivalent to the controller 160 setting the deceleration Rd to Rd=Rds=14 [rpm]/10 [ms].

Once the rotation speed decrease β is set in step S180 or S185, the operation proceeds to step S190. In step S190, the controller 160 calculates a new requested engine rotation speed Nr by subtracting the rotation speed β from the previous value for the requested engine rotation speed Nr, stores the new requested engine rotation speed Nr into the storage device and ends the arithmetic processing for calculating the requested engine rotation speed Nr in the ease-off operation mode, before the operation returns to step S101.

Figure 6:
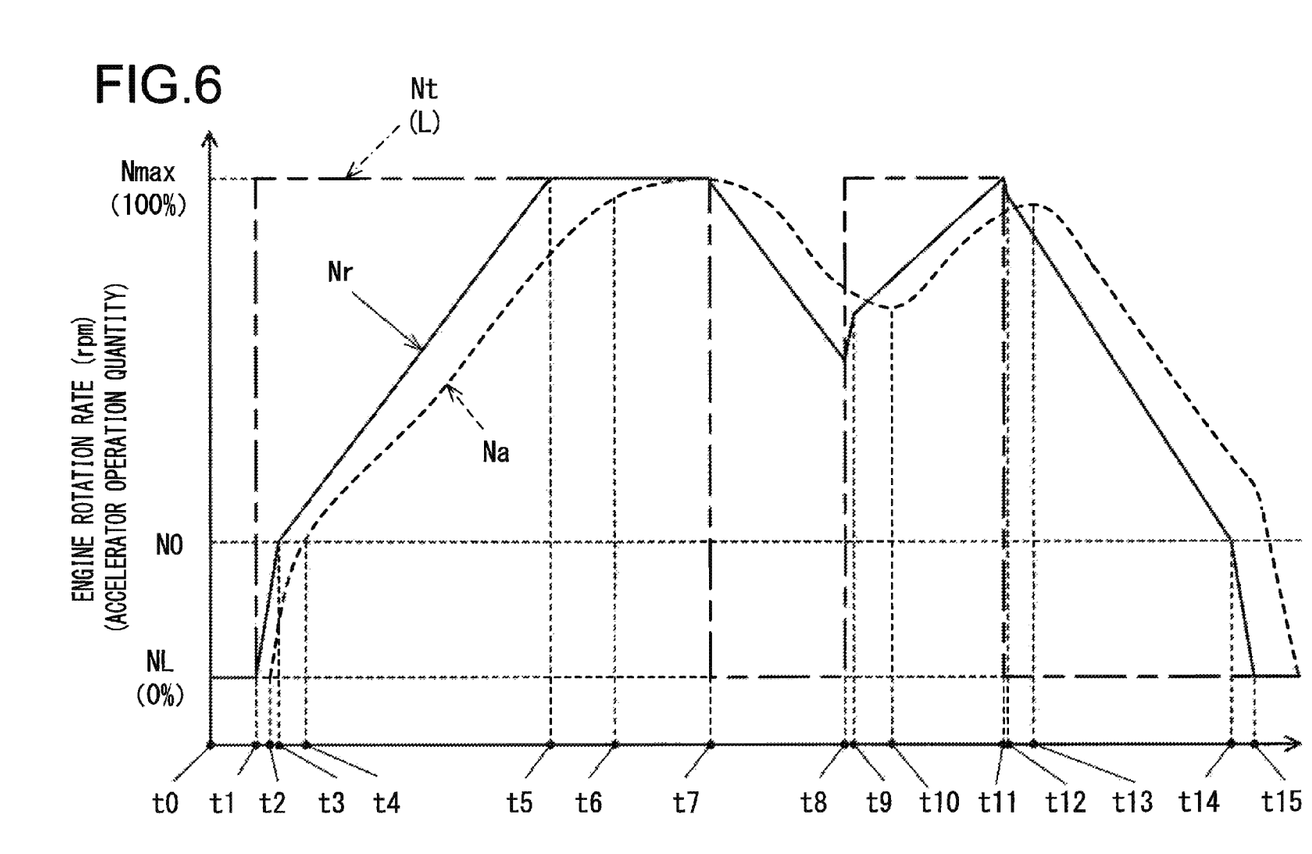
FIG. 6 A time chart related to a starting operation executed to start the wheel loader, a decelerating operation executed to decelerate the wheel loader, an accelerating operation executed to accelerate the wheel loader during deceleration and a decelerating operation executed to decelerate the wheel loader during acceleration in the embodiment

Essential operations of the work vehicle achieved in the embodiment will be described in reference to the time chart in FIG. 6. From a time point t0 through a time point t1, the accelerator pedal 192 is not operated, i.e., the accelerator pedal 192 is fully released, and in this state, the indicated engine rotation speed Nt, the requested engine rotation speed Nr and the actual engine rotation speed Na are all equal to the low idle rotation speed NL. The vehicle is in a stationary state.

—Stepping on the Accelerator Pedal in Stationary State (Time Point t1 Through Time Point t7)—

As the accelerator pedal 192 is stepped on to the maximum extent through the time period elapsing between a time point t1 and a time point t7, the indicated engine rotation speed Nt is set to the rated rotation speed Nmax corresponding to the operation quantity 100% (Nt=Nmax).

From the time point t1 through a time point t5, the absolute value of the difference between the indicated engine rotation speed Nt and the requested engine rotation speed Nr is equal to or greater than $\Delta N0$ (No in step S105 and Yes in step S107 to shift to step S110) even as the requested engine rotation speed Nr rises toward the indicated engine rotation speed Nt. From the time point t1 through a time point t3, the requested engine rotation speed Nr remains equal to or lower than the predetermined value N0 (Yes in step S115) even as the requested engine rotation speed Nr rises with the acceleration Ra=Rah (step S130→S140). From the time point t3 through the time point t5, the requested engine rotation speed Nr is higher than the predetermined value N0 (No in step S115) and the requested engine rotation speed Nr is higher than the actual engine rotation speed Na (No in step S120), and thus, the requested engine rotation speed Nr rises with the acceleration Ra=Ras (step S135→S140).

At the time point t5, the requested engine rotation speed Nr reaches the indicated engine rotation speed Nt (Yes in step S105), and from the time point t5 through the time point t7, the requested engine rotation speed Nr is sustained at the indicated engine rotation speed Nt.

The actual engine rotation speed Na changes so as to trail the increase in the requested engine rotation speed Nr. The actual engine rotation speed Na starts rising at a time point t2, occurring slightly after the time point t1. The actual engine rotation speed Na rises with a rapid rate of change from the time point t2 through a time point t4 primarily due to the influence of the requested engine rotation speed Nr rising (from the time point t1 through the time point t3) with the acceleration Ra=Rah. The acceleration in the actual engine rotation speed Na starts to lessen at the time point t4, primarily due to the influence of the requested engine rotation speed Nr rising (from the time point t3 through the time point t5) with the acceleration Ra=Ras and further lessens from a time point t6 as the acceleration in the requested engine rotation speed Nr becomes 0 (from the time point t5 through the time point t7). The actual engine rotation speed Na reaches the rated rotation speed Nmax at the time point t7.

Immediately after the vehicle starts, the requested engine rotation speed Nr, initially set at the low idle rotation speed NL, is controlled so as to rise with a high acceleration Rah until it reaches the predetermined value N0. Through these measures, the torque required for vehicle start from a standing stop can be achieved quickly and thus the vehicle start timing can be hastened. Subsequently, once the requested engine rotation speed Nr exceeds the predetermined value N0, the requested engine rotation speed Nr increases with the low acceleration Ras, and thus, excessive acceleration that would cause sudden starting of the vehicle can be prevented. In other words, through the embodiment, the occurrence of excessive acceleration that would cause the operator discomfort and uncertainty of operation can be prevented and, at the same time, the vehicle is able to quickly shift from a stationary state to a traveling state in response to the operator stepping on the accelerator pedal 192 to start the vehicle moving.

—Easing Off on the Accelerator Pedal to Exit the Traveling State at the Rated Rotation Speed (Time Point t7 Through Time Point t8)—

As the accelerator pedal 192 becomes completely released and thus enters a non-operation state during a period elapsing between the time point t7 and a time point t8, the indicated engine rotation speed Nt is set to the low idle rotation speed NL corresponding to the operation quantity 0% (Nt=NL).

From the time point t7 through the time point t8, the absolute value of the difference between the indicated engine rotation speed Nt and the requested engine rotation speed Nr is equal to or greater than $\Delta N0$ (No in step S105 and No in step S107, to shift to step S160), and the requested engine rotation speed Nr is lowered toward the indicated engine rotation speed Nt. From the time point t7 through the time point t8, the requested engine rotation speed Nr is higher than the predetermined value N0 (No in step S165), the actual engine rotation speed Na is higher than the requested engine rotation speed Nr (No in step S170), and the requested engine rotation speed Nr thus falls with the deceleration Rd=Rds (step S185→S190). The actual engine rotation speed Na decreases so as to trail the decrease in the requested engine rotation speed Nr.

—Stepping on the Accelerator Pedal to Exit the Decelerating State (Time Point t8 Through Time Point t11)—

As the accelerator pedal 192 is stepped on to the maximum extent again through the time period elapsing between the time point t8 and a time point t11, the indicated engine rotation speed Nt is again set to the rated rotation speed Nmax corresponding to the operation quantity 100% (Nt=Nmax).

Since the accelerator pedal 192 is stepped on to the maximum extent (Yes in step S107 to shift to step S110), the requested engine rotation speed Nr rises toward the indicated engine rotation speed Nt from the time point t8 through the time point t11. As illustrated in the figure, when the operator first steps on the accelerator pedal 192 at the time point t8 while the vehicle is decelerating, the actual engine rotation speed Na is higher than the requested engine rotation speed Nr. From the time point t8 through a time point t9, the requested engine rotation speed Nr is higher than the predetermined value N0 (No in step S115), the value obtained by subtracting the requested engine rotation speed Nr from the actual engine rotation speed Na is greater than the threshold value N1 (Yes in step S120) and the requested engine rotation speed Nr thus rises with the acceleration Ra=Rah (step S130→S140). From the time point t9 through the time point t11, the requested engine rotation speed Nr is higher than the predetermined value N0 (No in step S115), the value obtained by subtracting the requested engine rotation speed Nr from the actual engine rotation speed Na is equal to or less than the threshold value N1 (No in step S120), and thus, the requested engine rotation speed Nr rises with the acceleration Ra=Ras (step S135→S140).

The actual engine rotation speed Na changes so as to trail the increase in the requested engine rotation speed Nr. The deceleration in the actual engine rotation speed Na starts to lessen at the time point t8, a shift from decreasing to increasing occurs for the actual engine rotation speed Na at a time point t10 and the actual engine rotation speed starts to rise. As has been explained earlier, the requested engine rotation speed Nr rises with the high acceleration Rah following the start of the accelerator pedal step-on operation (time point t8) and then rises with the lower acceleration Ras from the time point t9. Through these measures, a decrease (overshoot) in the actual engine rotation speed Na can be avoided so that the vehicle is allowed to promptly shift from deceleration to acceleration immediately following the step-on operation and then to accelerate smoothly.

Control is executed so that the slowing vehicle can pick up speed with a high acceleration Rah if the difference between the actual engine rotation speed Na and the requested engine rotation speed Nr is great. Through these measures, the timing with which the vehicle shifts from deceleration to acceleration can be hastened. Subsequently, once the difference between the actual engine rotation speed Na and the requested engine rotation speed Nr becomes smaller, the vehicle picks up speed with the low acceleration Ras and thus the vehicle is prevented from pitching. Namely, through the embodiment, the occurrence of pitching can be prevented when the vehicle shifts from a decelerating state to an accelerating state and, at the same time, a shift from the decelerating state to the accelerating state can be achieved promptly in response to the operator stepping on the accelerator pedal 192, i.e., the tractive force can be promptly increased.

—Easing Off on the Accelerator Pedal to Exit an Accelerating State (Time Point t11 Through Time Point t15)—

As the accelerator pedal 192, completely released, enters a non-operation state at the time point t11, the indicated engine rotation speed Nt is set to the low idle rotation speed NL corresponding to the operation quantity 0% (Nt=NL).

Since, from the time point t11 through a time point t15, the accelerator pedal 192 remains fully released (No in step S107 to shift to step S160), the requested engine rotation speed Nr is lowered toward the indicated engine rotation speed Nt. As illustrated in the figure, when the accelerator pedal 192 in the accelerating vehicle is released at the time point t11, the requested engine rotation speed Nr is higher than the actual engine rotation speed Na. From the time point t11 through a time point t12, the requested engine rotation speed Nr is higher than the predetermined value N0 (No in step S165), the value obtained by subtracting the actual engine rotation speed Na from the requested engine rotation speed Nr is equal to or greater than the threshold value N2 (Yes in step S170) and the requested engine rotation speed Nr falls with the deceleration Rd=Rdh (step S180→S190). From the time point t12 through a time point t14, the requested engine rotation speed Nr is higher than the predetermined value N0 (No in step S165), the value obtained by subtracting the actual engine rotation speed Na from the requested engine rotation speed Nr is less than the threshold value N2 (No in step S170), and thus, the requested engine rotation speed Nr falls with the deceleration Rd=Rds (step S185→S190).

The actual engine rotation speed Na changes so as to trail the decrease in the requested engine rotation speed Nr. The acceleration in the actual engine rotation speed Na starts to lessen at the time point t11, a shift from increasing to decreasing occurs in the actual engine rotation speed Na at a time point t13 and the actual engine rotation speed starts to fall. As has been explained earlier, the requested engine rotation speed Nr falls with the high deceleration Rdh following the start of the pedal ease-off operation (pedal return operation) (time point t11) and then falls with the lower deceleration Rds from the time point t12. Through these measures, an increase (overshoot) in the actual engine rotation speed Na can be avoided so that the vehicle is allowed to promptly shift from acceleration to deceleration immediately following the ease-off operation and then to decelerate smoothly.

Control is executed so that the accelerating vehicle can lose speed with a high deceleration Rdh if the difference between the requested engine rotation speed Nr and the actual engine rotation speed Na is great. Through these measures, the timing with which the vehicle shifts from acceleration to deceleration can be hastened. Subsequently, once the difference between the requested engine rotation speed Nr and the actual engine rotation speed Na becomes smaller, the vehicle loses speed with the low deceleration Rds and thus the vehicle is prevented from pitching. Namely, through the embodiment, the occurrence of pitching can be prevented when the vehicle shifts from an accelerating state to a decelerating state and, at the same time, a shift from an accelerating state to a decelerating state can be achieved promptly in response to the operator easing off on the accelerator pedal 192 (return operation), i.e., the tractive force can be promptly decreased.

From the time point t14 through the time point t15, the requested engine rotation speed Nr is equal to or lower than the predetermined value N0 (Yes in step S165), and the requested engine rotation speed Nr decreases with the deceleration Rd=Rdh (step S180→S190).

In the embodiment, the requested engine rotation speed Nr is lowered with the low deceleration Rds until it reaches the predetermined value N0 (time point t12 through time point t14), and once it becomes lower than the predetermined value N0, the requested engine rotation speed Nr is lowered with the high deceleration Rdh (time point t14 through time point t15) so as to reduce fuel consumption.

The following advantages and operations are achieved through the first embodiment described above.

(1) When the requested engine rotation speed Nr is higher than the predetermined value N0, the acceleration Ra for the requested engine rotation speed Nr, i.e., the rotation speed increase to occur per unit time (e.g., 10 ms), is calculated based upon the difference between the requested engine rotation speed Nr and the actual engine rotation speed Na. As a result, the vehicle does not suddenly start or pitch as it starts moving and furthermore, a quick shift from deceleration to acceleration can be achieved, i.e., the tractive force can be quickly boosted. Since a comfortable ride is assured, the onus placed on the operator of the vehicle is reduced. Moreover, better work efficiency can be achieved.

(2) Assuming that the operator steps on the accelerator pedal 192 in a state in which the actual engine rotation speed Na is higher than the requested engine rotation speed Nr, the requested engine rotation speed Nr is calculated based upon the acceleration Rah if the difference between the actual engine rotation speed Na and the requested engine rotation speed Nr is greater than the threshold value N1 but the requested engine rotation speed Nr is calculated based upon the acceleration Ras, lower than the acceleration Rah, if the difference between the actual engine rotation speed Na and the requested engine rotation speed Nr is equal to or less than the threshold value N1. As a result, the vehicle shifting from a decelerating state to an accelerating state does not pitch. Furthermore, a prompt shift from the decelerating state to the accelerating state can be achieved in response to the operator stepping on the accelerator pedal 192, i.e., the tractive force can be quickly increased.

(3) Assuming that the operator steps on the accelerator pedal 192 in a state in which the requested engine rotation speed Nr is equal to or lower than the predetermined value N0, the requested engine rotation speed Nr is calculated based upon the acceleration Rah, higher than the acceleration Ras. Through these measures, it is ensured that when the vehicle starts moving from a standing stop, it is allowed to quickly shift from the stationary state to a traveling state in response to the operator stepping on the accelerator pedal 192. It is to be noted that immediately after the vehicle starts moving, the actual engine rotation speed Na is still lower than the requested engine rotation speed Nr and thus, the requested engine rotation speed Nr is calculated based upon the acceleration Ras after the requested engine rotation speed Nr exceeds the predetermined value N0. As a result, the occurrence of excessive acceleration, which would cause uncomfortable sudden starting, can be prevented.

(4) Assuming that the operator eases off on the accelerator pedal 192 in a state in which the actual engine rotation speed Na is lower than the requested engine rotation speed Nr, the requested engine rotation rate Nr is calculated based upon the deceleration Rdh if the difference between the requested engine rotation speed Nr and the actual engine rotation speed Na is equal to or greater than the threshold value N2 but the requested engine rotation speed Nr is calculated based upon the deceleration Rds, lower than the deceleration Rdh, if the difference between the requested engine rotation speed Nr and the actual engine rotation speed Na is less than the threshold value N2. As a result, the vehicle shifting from an accelerating state to a decelerating state does not pitch. Furthermore, a prompt shift from the decelerating state to the accelerating state can be achieved in response to the operator easing off on the accelerator pedal 192 (return operation), i.e., the tractive force can be quickly decreased.

(5) Assuming that the operator eases off on the accelerator pedal 192 in a state in which the requested engine rotation speed Nr is equal to or lower than the predetermined value N0, the requested engine rotation speed Nr is calculated based upon the deceleration Rdh, higher than the deceleration Rds. Namely, when the requested engine rotation speed Nr becomes lower than the predetermined value N0, the requested engine rotation speed Nr is lowered with the high deceleration Rdh and thus, fuel consumption is reduced.

The following variations are also within the scope of the present invention and one of the variations or a plurality of the variations may be adopted in combination with the embodiment described above.

(Variation 1)

While the acceleration and the deceleration for the requested engine rotation speed Nr are calculated based upon the difference between the requested engine rotation speed Nr and the actual engine rotation speed Na in the embodiment described above, the present invention is not limited to this example. The present invention may instead be adopted in a configuration in which only the acceleration is calculated for the requested engine rotation speed Nr.

(Variation 2)

When the operator steps on the accelerator pedal 192 in the embodiment described above, Rah is designated both as the acceleration Ra (hereafter will be notated as Ra1) based upon the requested engine rotation speed Nr being equal to or lower than the predetermined value N0 and as the acceleration Ra (hereafter will be notated as Ra2) based upon the requested engine rotation speed Nr being higher than the predetermined value N0 with the value obtained by subtracting the requested engine rotation speed Nr from the actual engine rotation speed Na exceeding the threshold value N1. However, the present invention is not limited to this example. In other words, the acceleration Ra1 and the acceleration Ra2 may be set to values different from each other.

When the operator eases off on the accelerator pedal 192 in the embodiment described above, Rdh is designated both as the deceleration Rd (hereafter will be notated as Rd1) based upon the requested engine rotation speed Nr being equal to or lower than the predetermined value N0 and as the deceleration Rd (hereafter will be notated as Rd2) based upon the requested engine rotation speed Nr being higher than the predetermined value N0 with the value obtained by subtracting the actual engine rotation speed Na from the requested engine rotation speed Nr, being equal to or greater than the threshold value N2. However, the present invention is not limited to this example. In other words, the deceleration Rd1 and the deceleration Rd2 may be set to values different from each other.

(Variation 3)

While the threshold value N1 and the threshold value N2 are set to the same value (e.g., 200 rpm) in the embodiment described above, the present invention is not limited to this example. Namely, the threshold value N1 and the threshold value N2 may be set to values different from each other.

(Variation 4)

While the engine 190 is utilized as a prime mover for driving the traveling hydraulic pump 132 and the like in the embodiment described above, the present invention is not limited to this example. An electric motor may instead be used as the prime mover and the traveling hydraulic pump 132 and the like may be driven by the electric motor.

(Variation 5)

While the indicated engine rotation speed Nt increases linearly in correspondence to an increase in the pedal operation quantity L at the accelerator pedal 192 in the embodiment described above, the present invention is not limited to this example. The indicated engine rotation speed Nt may instead be controlled so as to increase in a curvilinear manner or in steps in correspondence to an increase in the accelerator pedal operation quantity L.

(Variation 6)

While the present invention is adopted in a wheel loader in the embodiments described above, the present invention may be adopted in other industrial vehicles such as a wheel excavator, a forklift, a tele-handler and a lift-truck.

As long as features characterizing the present invention remain intact, the present invention is in no way limited to the particulars of the embodiment described above and any other modes conceivable within the scope of the technical teachings of the present invention will be considered within the scope of the present invention.

The disclosure of the following priority application is herein incorporated by reference:

Japanese Patent Application No. 2013-259022 filed Dec. 16, 2013

REFERENCE SIGNS LIST 101 center pin, 110 front body, 111 arm, 112 bucket, 113 tire, 115 bucket cylinder, 116 steering cylinder, 117 arm cylinder, 120 rear body, 121 operator's cab, 122 machine room, 130 transmission, 132 traveling hydraulic pump, 133 traveling hydraulic motor, 134 cutoff valve, 135 charge pump, 136 work hydraulic pump, 139 electromagnetic proportional pressure reducing valve, 140, tilt control lever, 142 charge relief valve, 143 overload relief valve, 144 regulator, 144*a* signal line, 145 stopper, 146 shuttle valve, 147 forward/reverse switching valve, 151*a*, 151*b* pressure detector, 160 controller, 160*a* indicated rotation speed setting unit, 160*b* pedal operation decision-making unit, 160*c* condition decision-making unit, 160*d* acceleration/deceleration setting unit, 160*e* requested rotation speed setting unit, 160*f* indicated rotation speed match decision-making unit, 180 tilting cylinder, 180*a*, 180*b* oil chamber, 180*c* piston, 181 engine rotation speed sensor, 190 engine, 191 engine controller, 192 accelerator pedal, 192*a* operation quantity detector, 195 forward/reverse switching lever.

The invention claimed is:

1. A work vehicle equipped with an hydrostatic transmission traveling drive device, comprising:
   an operation quantity detector that detects an operation quantity representing an extent to which an accelerator pedal is operated;
   a rotation speed detector that detects an actual engine rotation speed at an engine;
   an indicated engine rotation speed setting unit that sets an indicated engine rotation speed for the engine based upon the operation quantity detected by the operation quantity detector;
   a requested engine rotation speed calculation unit that calculates a requested engine rotation speed for the engine each predetermined control cycle;
   a pedal operation decision-making unit that makes a decision whether the accelerator pedal is in a stepping on operation or in an easing off operation based upon the indicated engine rotation speed set by the indicated engine rotation speed setting unit and a preceding requested engine rotation speed calculated for an immediately preceding control cycle by the requested engine rotation speed calculation unit;
   a condition decision-making unit that makes a decision whether to raise or lower the requested engine rotation speed based upon a decision result by the pedal operation decision-making unit, the requested engine rotation speed and a difference between the requested engine rotation speed and the actual engine rotation speed detected by the rotation speed detector;
   an acceleration/deceleration setting unit that sets an acceleration or a deceleration of the requested engine rotation speed based upon the decision result by the condition decision-making unit; and
   an engine control unit that controls the actual engine rotation speed based upon the requested engine rotation speed calculated by the requested engine rotation speed setting unit, wherein:
   the requested engine rotation speed calculation unit calculates a new requested engine rotation speed based upon the preceding requested engine rotation speed calculated for the immediately preceding control cycle based upon the acceleration or the deceleration set by the acceleration/deceleration setting unit.

2. The work vehicle according to claim 1, wherein:
   if the pedal operation decision-making unit decides that the accelerator pedal is in the stepping on operation and the condition decision-making unit decides that the requested engine rotation speed is greater than a predetermined value, then
   if the difference between the requested engine rotation speed and the actual rotation speed is greater than a first threshold value, the acceleration/deceleration setting unit sets the acceleration to a first acceleration, or
   if the difference between the requested engine rotation speed and the actual engine rotation speed is equal to or less than the first threshold value, the acceleration/deceleration setting unit sets the acceleration to a second acceleration, less than the first acceleration.

3. The work vehicle according to claim 2, wherein:
   if the pedal operation decision-making unit decides that the accelerator pedal is in the stepping on operation and the condition decision-making unit decides that the requested engine rotation speed is equal to or lower than the predetermined value, the acceleration/deceleration setting unit sets acceleration to a third acceleration, higher than the second acceleration.

4. The work vehicle according to claim 1, wherein:
   if the pedal operation decision-making decides unit that the accelerator pedal is in the ease-off operation and the condition decision-making unit decides that the requested engine rotation speed is greater than a predetermined value, then
   if the difference between the requested engine rotation speed and the actual engine rotation speed is greater than or equal to a second threshold value, the acceleration/deceleration setting unit sets the deceleration to a first deceleration, or
   if the difference between the requested engine rotation speed and the actual engine rotation speed is less than the second threshold value, the acceleration/deceleration setting unit sets the deceleration to a second deceleration, lower than the first deceleration.

5. The work vehicle according to claim 4, wherein:
   if the pedal operation decision-making unit decides that the accelerator pedal is in the ease-off operation and the condition decision-making unit decides that the requested engine rotation speed is equal to or less than the predetermined value, the acceleration/deceleration setting unit sets the deceleration to a third deceleration, higher than the second deceleration.

* * * * *